Aug. 23, 1960 W. H. SMITH 2,949,792
DIFFERENTIAL ASSEMBLY
Filed Nov. 9, 1959 2 Sheets-Sheet 1

INVENTOR.
Warren H. Smith
BY
L. D. Burch
ATTORNEY

Aug. 23, 1960  W. H. SMITH  2,949,792
DIFFERENTIAL ASSEMBLY
Filed Nov. 9, 1959  2 Sheets-Sheet 2

INVENTOR.
Warren H. Smith
BY
L. D. Burch
ATTORNEY

United States Patent Office 2,949,792
Patented Aug. 23, 1960

2,949,792

DIFFERENTIAL ASSEMBLY

Warren H. Smith, Birmingham, Mich., assignor to General Motors Corporation, Detroit, Mich., a corporation of Delaware Filed Nov. 9, 1959, Ser. No. 851,721

5 Claims. (Cl. 74—711)

This invention relates to motor vehicle differential assemblies and more particularly to a fluid operated locking type of differential assembly.

In the operation of motor vehicles it often happens that the vehicle is situated with one wheel on a slippery surface, such as ice or grease, and the opposite wheel on a dry surface, such as dry pavement. The power transmitted to the driving wheels through the differential unit is diverted to the driving wheel having the least amount of resistance, and in such a situation it is obvious that the wheel resting on the slippery surface will spin quite rapidly and the wheel resting on the dry surface will be stationary.

Many attempts have been made to overcome these adverse situations, resulting in many different types of locking differentials. Most common is the use of a mechanical locking device of some sort which causes the side gear connected to the stationary wheel to be clamped, or otherwise clutched, to the differential carrier, causing the stationary wheel to rotate with the carrier and thus rotate the stationary wheel and axle.

In most of the locking differentials where mechanical actuation is provided, the variables such as engine weight and amount of friction resistance necessary to lock the parts do not permit the differential unit to be universally used. This is an extreme disadvantage from the standpoint of an automobile manufacturer who produces several different lines of automobiles, each one having a different weight and a different load distribution.

A further disadvantage of such locking differentials is that no attempt is made to bring the spinning wheel down to carrier speed when bringing the stationary wheel up to carrier speed, causing a jolt when the wheels begin to rotate together and resulting in wear on the vehicle tires.

The device in which this invention is embodied is a locking differential for use under such adverse conditions as where one wheel may be allowed to spin while the other remains stationary. The device comprises, generally, a pair of fluid pumps located in the differential carrier that convey fluid under pressure to a piston, which in turn actuates a clutch assembly to secure the stationary axle to the carrier and provide for unit rotation of the parts and for rotation of the stationary wheel. A further advantage lies in the possibility of slowing the spinning wheel to the rotational speed of the carrier, at the same time as the stationary wheel is brought up to the speed of the carrier. This provides smoother vehicle operation and less jolts and jars when the stationary wheel begins to rotate.

The differential assembly is independent of the vehicle weight or load distribution, insofar as actuation of the locking features is concerned, thus providing a differential unit that may be used universally with several lines of automobiles.

These and other advantages will become more apparent from the following description and drawings in which.

Figure 1:
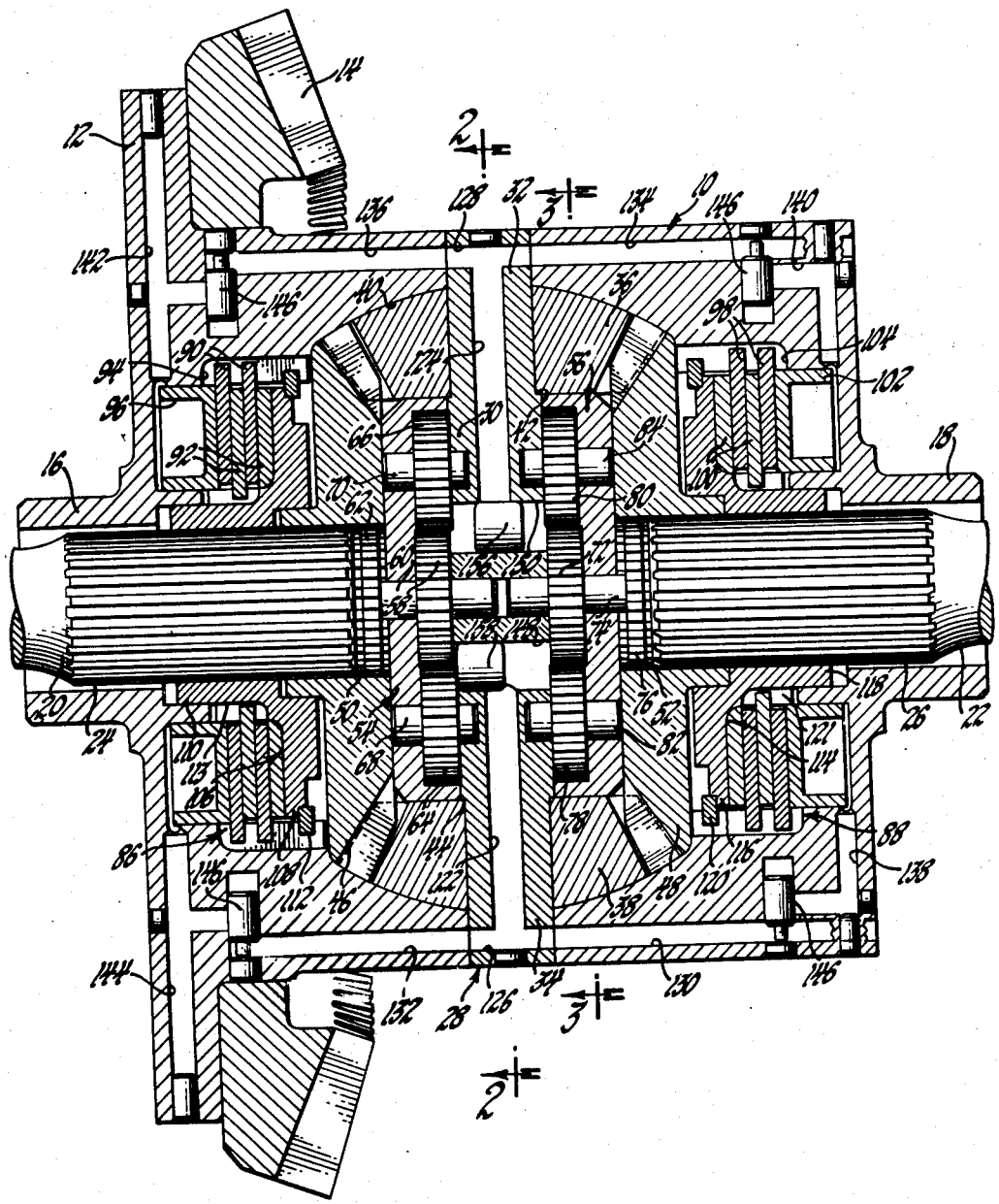
Figure 1 is an elevational view of the locking differential assembly with parts broken away and in section to illustrate the location of the pump assemblies.

Referring more particularly to the drawings, the overall differential assembly is best described with reference to Figure 1. A carrier, illustrated generally by the numeral 10, has an annular flange 12 extending radially outwardly therefrom and to which is secured in some suitable manner the usual differential ring gear 14. The ring gear 14 is actuated by a differential drive pinion (not shown) which transmits torque from the vehicle propeller shaft to the differential unit and thence to the driving wheels. Extending from each side of the carrier 10 are sleeves 16 and 18 which receive axle shafts 20 and 22 extending outboard to the driving wheels. The axle shafts 20 and 22 are provided with externally splined portions 24 and 26 for securement to the remainder of the differential assembly.

A crosspin assembly, illustrated generally by the numeral 28, includes a body portion 30 and shaft portions 32 and 34 on which are disposed conventional differential gears 36 and 38. The differential gears are adapted for rotational movement about the axis of the shaft portions 32 and 34 of the crosspin assembly. The gears 36 and 38 are located on the shaft portions 32 and 34 by the wall of the cavity 40 in the carrier 10 in which they are received, and by annular shoulders 42 and 44 at the junction of the shaft portions 32 and 34 with the central body portion 30.

A pair of conventional differential side gears 46 and 48 are also disposed in the cavity 40 formed in the carrier 10 and engage and mesh with the differential gears 36 and 38. The side gears 46 and 48 are provided with internal splines 50 and 52 which engage the externally splined portions 24 and 26 of the axle shafts 20 and 22 respectively. Thus, the axle shafts are provided rotational movement along with the side gears 46 and 48.

Located in the carrier 10, and within the rectangle formed by the differential gears 36 and 38 and the side gears 46 and 48, are a pair of pump assemblies, illustrated generally by the numerals 54 and 56. Pump assembly 54 comprises, generally, a main pump gear 58 which is journaled in the crosspin body 30 by means of a pin 60. Located at the outboard end of the pin 60 is a splined member 62 which is received in the internal splines 50 formed in the side gear 46. Thus, the pump drive gear 58 rotates along with the drive gear 46. Secondary pump gears 64 and 66 are journaled in the crosspin body portion 30 on pins 68 and 70 respectively, and engage and mesh with the main pump gear 58.

The construction of the pump assembly 56 is substantially the same as that above-described. A main pump gear 72 is journaled in the crosspin body 30 on a pin 74, and has a splined member 76 received in the internal splines 52 of the side gear 48. Secondary pump gears 78 and 80 engage and mesh with the main pump drive gear 72 and are journaled in the crosspin body portion 30 on the pins 82 and 84 respectively.

Also located within the differential carrier 10 are a pair of clutch assemblies, illustrated generally by the numerals 86 and 88. One of the clutch assemblies is located at each side of the differential carrier adjacent one of the side gears 46 and 48. The clutch assembly 86 comprises, generally, a series of clutch plates 90 and 92, clutch plates 90 being received in a groove 94 formed in the carrier 10 to prevent relative rotation of the clutch plates 90 and the carrier 10, and clutch plates 92 are secured against relative rotation in a manner to be later described. An annular piston 96 abuts the outboard clutch plate face and is adapted to be moved inwardly to engage the clutch plates for purposes to be later described.

The clutch assembly 88 is substantially the same as that above described, having clutch plates 98 and 100 adapted to be engaged by the annular piston 102. Clutch plates 98 are received in a groove 104 formed in the carrier to prevent relative rotation between the clutch plates 98 and the carrier 10. Clutch plates 100 are similarly secured in a manner to be later described.

Adjacent the inboard clutch plate of the clutch assembly 86 is a sleeve, illustrated generally by the numeral 106, having an annular flange 108 adapted to engage the adjacent clutch face. A sleeve portion 110 has an internal spline formed therein and is received about the externally splined portion 24 of the axle shaft 20 to provide rotation of the sleeve member 106 along with the axle shaft 20. A retaining ring 112 locates the sleeve member 106 in its proper position in the carrier 10. A groove 113 formed in the sleeve member receives clutch plates 92 to prevent relative rotation therebetween.

A similar sleeve member 114 is provided adjacent the inboard clutch plate 100 of the clutch assembly 88. An annular flange 116 extending radially outwardly abuts inboard face of the adjacent clutch plate, and the sleeve portion 118 has an internal spline formed therein to engage the splined portion 26 of the axle shaft 22. A suitable retaining ring 120 is provided to limit the inward movement of the sleeve member 114 in the carrier 10. A groove 121 receives clutch plates 100 to prevent relative rotation therebetween.

In order to allow for the passage of fluid from the pump assemblies 54 and 56, passages 122 and 124 are provided in the shaft portions 32 and 34 of the crosspin assembly 28. Passages 122 and 124 terminate in transverse passages 126 and 128 respectively, which in turn communicate with passages 130, 132, 134, and 136 formed in the carrier 10. Further passages 138, 140, 142, and 144 are provided in the carrier and in communication with passages 130, 132, 134, and 136 to convey the fluid to the outboard faces of the pistons 96 and 102. Suitable check valves 146 are provided between the group of passages numbered 130 to 136 and the group of passages numbered 138 to 144. Check valves 146 are normally closed, and may be held in this position by light spring pressure or by centrifugal force. The purpose for check valves 146 will be later described.

Figure 2:
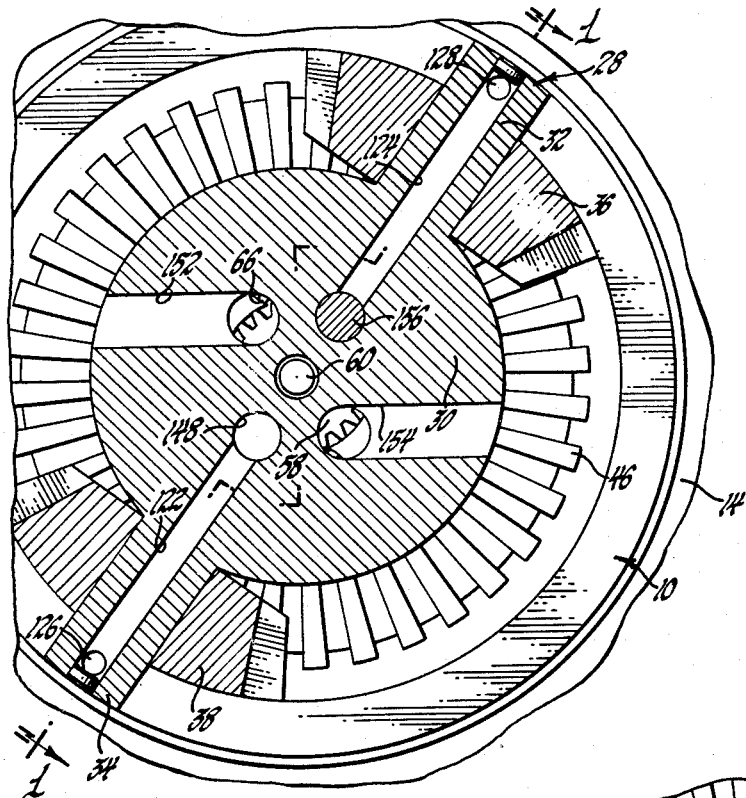
Figure 2 is a cross-sectional view of the structure illustrated in Figure 1 taken substantially along the line 2—2 and looking in the direction of the arrows, to illustrate the location of the various parts.
Figure 3:
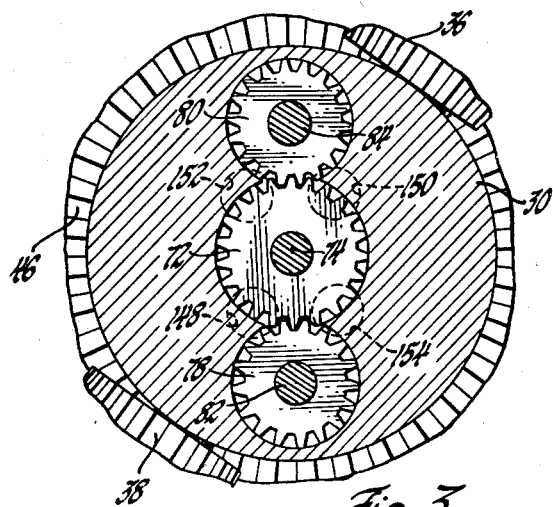
Figure 3 is a cross-sectional view of a portion of the device illustrated in Figure 1 taken substantially along the line 3—3 of Figure 1 and looking in the direction of the arrows, to illustrate the position of the various parts.

A pair of internal transverse passages 148 and 150 are formed in the body 30 of the crosspin assembly 28 and extend between the gears of the pump assemblies 54 and 56. Passages 148 and 150 also communicate with fluid inlet passages 152 and 154 (Figure 2) through the pump gears of the pump assemblies. A pair of cylindrical check valves 156 and 158 are provided in the passages 148 and 150 for purposes to be later described.

The operation of the device may best be illustrated with reference to various situations in which the motor vehicle may be found.

Assuming first that the driving wheels are both on dry pavement, normal differential action is carried out in which the differential drive pinion (not shown) transmits driving torque and rotation to the ring gear 14 and the carrier 10 to which the ring gear is secured. Rotation of the carrier 10 causes rotation of the crosspin assembly 28 and the differential gears 36 and 38, without rotation of the differential gears about the shaft portions 32 and 34 of the crosspin assemblies. Thus, the differential side gears 46 and 48 rotate along with the differential gears 36 and 38 and in turn impart rotation to the axle shafts 20 and 22 and to the road wheels. Upon cornering, or passing over obstacles, or the like, where one road wheel must rotate relative to the opposite road wheel, normal differential action is provided by the differential gears 36 and 38, rotating about the shaft portions 32 and 34 of the crosspin assembly 28 to allow the side gears 46 and 48 to rotate relative to each other to a sufficient degree, thus altering the relative positions of the axle shafts 20 and 22 and the road wheels (not shown).

A second situation may exist in which the left wheel and axle shaft 20 as viewed in Figure 1 may be rotating freely as a result of the road wheel being on a slippery surface, and the right wheel and axle shaft 22 being stationary, as caused by the road wheel being on a dry surface at the same time. In such a situation the drive pinion is causing the ring gear 14 and carrier 12 to rotate, in accordance with the speed of the engine, which carries the crosspin assembly 28. Since the axle shaft 20 may rotate freely, all of the driving torque would normally be transmitted thereto through the differential gears and the side gears, allowing the axle shaft 22 to remain stationary by means of the differential gears 36 and 38 rotating about the crosspin assembly 28. In effect, the side gear 48 would be stationary relative to the rapidly rotating side gear 46. Under this condition, it may be seen that drive gear 72 of the pump assembly 56 remains stationary along with side gear 48, and the secondary pump gears 78 and 80 rotate around the main drive gear 72 since they are carried by the body portion 30 of the crosspin assembly 28 rotating with the carrier 10. Depending on the direction of rotation, that is, if the spinning wheel is tending to go forward or in reverse, one of the secondary pump gears pumps fluid from the inlet passage 152, between itself and the main drive gear 72 and into the passage 148 or 150 in the center of the crosspin assembly. Assuming for purposes of illustration that the direction is forward, the pumping action taking place between pump gear 78 and the main drive gear 72 which would force check valve 158 to the left, as viewed in Figure 1, opening passage 122 to passage 148. Fluid is then conveyed through the shaft portion 34 of the crosspin assembly 28 and through passages 130 and 132 in the carrier. Check valves 146 located in these passages are lifted by the pressure of the fluid permitting the fluid to pass through passages 138 and 144 to the operating face of the annular pistons 96 and 102. The pistons are forced inwardly, as viewed in the drawing, to cause the clutch faces to engage, forcing the clutch plates 90, 92 and 98 and 100 into engagement with each other and into engagement with the sleeve members 106 and 114, locking the carrier and the sleeve together to prevent relative rotation. At the same time this action is being carried out, the opposite pump assembly 54 has its gears rotating relative to each other, gear 66 and main drive gear 58 causing fluid to be pumped from the inlet 154 into passage 150 moving check valve 156 toward the right and opening passage 124 to the passage 150. Fluid is then conveyed through the passages 134 and 136 in the carrier past the check valves 146 and into the passages 140 and 142 to engage the operating faces of the pistons 96 and 102. This also compresses the clutch plates locking the sleeves 106 and 114 to the carrier and preventing relative rotation therebetween.

By the above described action it may be seen that the stationary road wheel and axle shaft 22 are caused to rotate with the differential carrier 10, since the carrier and the spline sleeve 114 are locked together, and the rapidly spinning wheel and axle shaft 20 are slowed down by the action of the clutch plates locking the carrier 10 to the sleeve 106. The road wheels and axle shafts 20 and 22 thus rotate together and at the same speed for normal vehicle operation.

The remaining situation to be cited would be where the rapidly spinning wheel is rotating in a reverse direction in which the same action would take place except that the opposite gears in the pump assemblies 54 and 56, namely the secondary gears 64 and 80 would rotate along with the main drive gears 58 and 72 respectively, to pump fluid from the inlets to the pistons 96 and 102 to engage the clutch plates and lock the carrier to the sleeves 106 and 114.

Thus, it may be seen that a locking differential is provided which is positive in its operation and is not dependent on vehicle weight or load distribution for normal operation. It may further be seen that the action of the locking differential not only causes a relatively stationary wheel to begin rotating but also causes a rapidly rotating wheel to slow down to the differential carrier speed.

What is claimed:

1. A differential assembly for a motor vehicle comprising a carrier, a crosspin mounted in said carrier and rotatable therewith, diffferential gears on said crosspin and within said carrier, side gears mounted in said carrier and engaging said differential gears, axle shafts extending from said carrier and rotatable with said side gears, pump means in said carrier and connected to said side gears and operable thereby, clutch means in said carrier and adapted to lock said axle shafts to said carrier for rotation therewith, piston means in said carrier and adjacent said clutch means, fluid passage means through said crosspin and in said carrier and communicating between said pump means and said pistons, fluid inlet means in said carrier and said crosspin and communicating with said pump means, said pump means being operable when there is relative rotation between said side gears to pump fluid through said fluid passage means and actuate said piston means to engage said clutches and lock said side gears to said carrier.

2. A differential assembly for a motor vehicle comprising a carrier, a crosspin mounted in said carrier and rotatable therewith and having fluid passage means therethrough, differential gears mounted on said crosspin and rotatable thereabout, side gears disposed in said carrier and engaging said differential gears, an axle shaft spline connected to each of said drive gears and rotatable therewith, clutch means operating between said carrier and each of said drive gears, a piston engaging said clutch means, pump means mounted in said carrier and operable by said drive gears, said pump means communicating with said fluid passage means in said crosspin, fluid passage means in said carrier and communicating between said fluid passage means in said crosspin and said pistons, and fluid inlet means in said carrier and in said crosspin and communicating with said pump means, said pump means being operable upon relative rotation between said side gears to pump fluid through said passage means and to said pistons to cause said pistons to engage said clutch means and lock said side gears to said carrier to prevent relative rotation between said side gears and said axle shafts.

3. A differential assembly for a motor vehicle comprising a carrier, a ring gear secured to said carrier and rotatable therewith, a crosspin secured in said carrier and rotatable therewith and having a passage formed lengthwise therethrough, a pair of differential gears rotatably secured on said crosspin adjacent the ends thereof and within said carrier, a pair of side gears rotatably mounted in said carrier and each of said side gears engaging each of said differential gears, a pair of axle shafts extending from said carrier and drivingly engaging said side gears, pump means associated with each of said drive gears and drivingly connected thereto and communicating with said passage in said crosspin, clutch means disposed in said carrier and engaging said axle shafts, a piston at each side of said carrier and engageable with said clutch means, fluid passage means communicating between said passage in said crosspin and said piston, and fluid inlet means communicating with said pump means, said pump means being operable when one of said axle shafts rotates relative to the other of said axle shafts to pump fluid through said passage in said crosspin and said fluid passage means and to said pistons to cause said pistons to engage said clutch means and lock said side gears to said carrier for rotation of said side gears and said axle shafts with said carrier and to prevent relative rotation between said axle shafts.

4. A differential assembly for a motor vehicle comprising a carrier, a crosspin mounted in said carrier and rotatable therewith, differential gears on said crosspin and within said carrier and rotatable about said crosspin, side gears in said carrier and engaging said differential gears, axle shafts extending from said carrier and rotatable with said side gears, clutch means in said carrier and adapted to lock said axle shafts to said carrier for rotation therewith, a plurality of pump gears journaled in said crosspin, some of said pump gears being operatively connected to said side gears for rotation therewith, the others of said pump gears engaging said first named pump gears for causing fluid to flow therebetween on relative rotation between said side gears and said carrier, fluid inlet means to said pump gears, and fluid passage means between said pump gears and said clutch means for conveying fluid therethrough to actuate said clutch means and lock said differential assembly.

5. A differential assembly for a motor vehicle comprising a carrier, a crosspin mounted in said carrier and rotatable therewith, a differential gear rotatably secured on said crosspin and within said carrier, a side gear rotatably mounted within said carrier and engaging said differential gear and having internal splines formed therein, an axle shaft extending from said carrier and having external splines formed thereon engaging said internal splines in said drive gear, a sleeve member received about said axle shaft and within said housing and having internal splines engaging said external splines on said axle shaft, clutch means disposed between said sleeve and said carrier, a main pump gear journaled in said crosspin and operatively connected to said side gear for rotation therewith, secondary pump gears journaled in said housing and engaging said main pump gear, fluid inlet means in said carrier and said crosspin and communicating with said pump gears, and fluid passage means between said pump gears and said clutch means for conveying fluid under pressure to said clutch means to lock said sleeve to said carrier and prevent relative motion between said axle shaft and said carrier.

References Cited in the file of this patent

UNITED STATES PATENTS

| 2,734,398 | Bottcher | Feb. 14, 1956 |
| 2,861,477 | Mueller | Nov. 25, 1958 |